United States Patent [19]

Augustin

[11] 4,019,912

[45] Apr. 26, 1977

[54] FRICTIONAL MATERIAL REINFORCED WITH CARBONACEOUS FIBERS

[75] Inventor: Wilfried Augustin, Reinbek, Germany

[73] Assignee: Jurid Werke GmbH, Glinde, Germany

[22] Filed: Aug. 31, 1972

[21] Appl. No.: 285,524

[30] Foreign Application Priority Data

Sept. 4, 1971 Germany .................... 2144367

[52] U.S. Cl. .................................................. 106/36
[51] Int. Cl.² ........................................... C09K 3/14
[58] Field of Search .......................... 106/36, 39

[56] References Cited

UNITED STATES PATENTS

| | | | |
|---|---|---|---|
| 2,673,146 | 3/1954 | Kuzmick et al. | 106/36 |
| 3,019,514 | 2/1962 | Bickelhaupt et al. | 29/182.5 |
| 3,191,278 | 6/1965 | Kendall et al. | 29/182.5 |
| 3,307,969 | 3/1967 | Quinn | 117/126 |
| 3,494,774 | 2/1970 | Bray | 106/36 |
| 3,736,159 | 5/1973 | Gibson | 264/29 |

FOREIGN PATENTS OR APPLICATIONS

| | | | |
|---|---|---|---|
| 228,493 | 6/1960 | Australia | 106/36 |
| 1,188,220 | 3/1965 | Germany | 106/36 |
| 326,267 | 3/1930 | United Kingdom | 106/36 |
| 995,198 | 6/1965 | United Kingdom | 106/36 |

OTHER PUBLICATIONS

Chem. Abst. 72:82515v. 1970.

*Primary Examiner*—Theodore Morris
*Attorney, Agent, or Firm*—Young & Thompson

[57] ABSTRACT

A friction material which has the temperature capacity of an inorganically-bound material and the softness, minimum attack on the counter material and the noiselessness of an organically-bound material, and which comprises an inorganic binding agent in combination with reinforcing fibers of carbonaceous or carbon-containing material. The volume ratio between the inorganic binding agent and the carbonaceous or carbon-containing reinforcing fibers may vary in the range from 99:1 to 10:90. The reinforcing fibers preferably are fibers of synthetic or natural high polymers, such as polyacrylonitrile, rayon or cellulose fibers, as well as products obtained by the pyrolysis of these high polymers, such as carbon fibers.

1 Claim, No Drawings

FRICTIONAL MATERIAL REINFORCED WITH CARBONACEOUS FIBERS

SUMMARY OF THE INVENTION

The invention relates to a friction material which contains reinforcing fibers.

It has already been proposed to produce friction layers from fiber-reinforced organic duromers and elastomers. The fibers used are generally of asbestos or synthetic inorganic fibers, for example slag wool, glass wool, mineral wool, aluminum silicate fibers and the like. For certain purposes, it is also known to include metal fibers. Friction materials are likewise already known which contain organic fibers, for example cotton or synthetic fibers. This type of friction material allows the braking or deceleration of vehicles and machines of all kinds to occur in an acceptable and problem-free manner, within certain temperature limits. The disadvantage of this kind of friction lining is however the limited temperature usable, emphasized by the disintegration of the organic binding agent at high temperatures.

Attempts have been made to change the organic binding for an inorganic binding. Such inorganically bound friction materials are known. As well as the inorganic binding agent, for example glass frits or sintered metals, they also contain pulverulent additives, such as metals, metal oxides, metal salts and, as a lubricant (sliding agent), graphite powder. Friction materials of this kind can withstand essentially higher temperature loads, as compared with organically bound friction materials, but are very hard and brittle. They are inclined to attach strongly the counter material and are very subject to noise. Soft braking is therefore not possible.

It is an object of the invention to provide a friction material which has the temperature capacity of an inorganically-bound material and the softness, minimum effect on the counter material and the noiselessness of an organically-bound friction material.

Another object of the invention is to provide an improved friction material which comprises an inorganic binding agent and reinforcing fibers of carbon-containing material.

The invention resides, in large measure, in the discovery that reinforcing fibers in the form of carbon-containing or carbonaceous fibers may be added to an inorganic binding agent to surprisingly yield an improved friction material of high temperature stability. It is advantageous to make the volume ratio between the inorganic binding agent and the carbonaceous or carbon-containing reinforcing fibers in the range from 99:1 to 10:90. In the friction material according to the invention, materials modifying the friction value can additionally be included, for example lubricants, grinding agents, materials altering the heat conduction capacity and the like. These modifying materials include the usual substances which influence friction properties, for example asbestos, ceramic powder, such as aluminum oxide, silicon oxide, silica, silicates, magnesium oxide, zirconium oxide, sillimanite, mullite and/or metal salts, for example barium sulphate or carbonate, and/or metal powders, such as iron powder, or even silicon carbide or corundum. Also, the usual lubricant or sliding additives, such as graphite, molybdenum disulphide, cumarone resins, epoxide resins, colophony and rubber and caoutchouc are additional modifying substances.

Whilst the known friction materials are so formulated that the reinforcing and friction-bearing fibers and other materials represent the hard part of the friction material and are fixed by the organic and/or inorganic binding agent, this function is reversed in the friction material according to the invention; in this new friction material, the binding agent is the hard friction-bearing part and the reinforcing fibers are the soft part generating the protective braking action.

In reversing the relationship which obtains in known organic layers, in which the binding agent is a soft carbon-containing material and the reinforcing and friction-bearing materials are inorganic and, in the main mineral fibers, in the friction material according to the invention the inorganic binding agent is at the same time the friction bearer, whereas the soft reinforcing carbon-containing fibers produce the desired soft braking effect.

In the friction material according to the invention, any inorganic material known for this purpose can be used as the inorganic binding agent. This includes materials or material mixtures which in the end phase are of a non-metallic nature and which can be transformed by smelting, sintering or dehydrating from the plastically deformable state into the hard, no longer deformable state. Examples of such inorganic binding agents are glass frits, clay mixes, stoneware, earthware, porcelain, $Al_2O_3$ materials, cordierite mixes, steatite mixes, wollastonite mixes, spinels, forsterite mixes, lithium aluminum silicate materials, magnesium oxide, beryllium oxide materials, rutile mixes, titanate materials, ferrites, phosphate-bound materials and metal sulphide-forming materials.

In the friction material according to the invention, those fibers can be included, as the carbon-containing fibers, which possess carbon atoms in the molecular structure of the main chains. They can therefore include fibers of synthetic or natural high polymers, for example polyacrylonitrile, rayon or cellulose fibers, as well as products obtained by the pyrolysis of these high polymers, such as carbon fibers or graphite fibers, which are obtainable as commercial products. Theoretically, any stage in the pyrolysis in fiber form can be included in the friction material according to the invention. Pyrolysed fibers produced by thermal treatment of tar, pitch, bitumen, asphalts or other petrochemical materials can also be used in friction materials according to the invention.

The production of the friction material according to the invention is carried out in the way known for friction materials, by compression of the starting mixture and, if required, associated heat treatment with a protective gas atmosphere, if desired. The usual additional materials influencing the friction properties can thus also be included. Also, it can be advantageous to include additives for modifying the heat conductivity of the material in a predetermined way.

It is particularly advantageous to add technically inexpensive fiber material e.g. plastics fibers, such as polyacrylonitrile fibers, to the friction mixture, such as the usual inorganic binding agent with additives to form carbon fibers, which commercially are a relatively expensive product.

In the following Examples, in which the amounts are given in parts by volume, the invention will be more

EXAMPLE 1

A mixture was produced from:
| | |
|---|---|
| 60 parts | inorganic binding agent mixture (steatite powder) |
| 30 parts | graphite fiber (rayon fiber, staple length about 10 mm, tensile strength about $2 \times 10^4$ kp/cm) |
| 10 parts | metal fibers. |

After thorough mixing, the mixture was compressed at 400 kp/cm² Then, it was heated slowly and burned at 1100° C. under a protective gas atmosphere.

EXAMPLE 2

A mixture was produced from the following components:
| | |
|---|---|
| 30 parts | inorganic binding agent mixture (glass frits) |
| 40 parts | rayon fibers, partially pyrolysed (at 300° C., $N_2$ atmosphere) (staple fiber, length about 10 mm) |
| 20 parts | metal powder |
| 5 parts | graphite powder as lubricant |
| 5 parts | SiC powder as grinding agent. |

The mixture was compressed at 400 kp/cm² and after slowly heating was burned at 900° C. under a protective gas.

EXAMPLE 3

A mixture of:
| | |
|---|---|
| 35 parts | inorganic binding agent (bonding clay) |
| 40 parts | polyacrylonitrile fibers (staple fiber, length about 10 mm) |
| 25 parts | metal powder | was compressed at 400 kp/cm² and, after slowly heating, burned at 900° C. under a protective gas.

The friction layers prepared from the friction materials according to the invention can be successfully subjected to high temperatures. They make soft braking possible.

We claim:

1. A friction material consisting essentially of a compressed and burned mixture of 30–60 parts by weight of a particulate inorganic nonmetallic binder selected from the group consisting of steatite powder, glass frits and clay, 10–30 parts by weight of at least one friction-modifying constituent selected from the group consisting of metal powder, metal fibers, silicon carbide powder and graphite powder, and 30–40 parts by weight of carbonized organic fibers.

* * * * *